(12) United States Patent
Brill et al.

(10) Patent No.: US 7,233,892 B2
(45) Date of Patent: Jun. 19, 2007

(54) METHOD AND APPARATUS FOR UNSUPERVISED TRAINING OF NATURAL LANGUAGE PROCESSING UNITS

(75) Inventors: Eric D. Brill, Redmond, WA (US); Arul A. Menezes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/204,213

(22) Filed: Aug. 15, 2005

(65) Prior Publication Data

US 2005/0273317 A1 Dec. 8, 2005

Related U.S. Application Data

(62) Division of application No. 09/849,833, filed on May 4, 2001, now Pat. No. 7,016,829.

(51) Int. Cl.
*G06F 17/27* (2006.01)
*G06F 17/20* (2006.01)
*G06F 17/28* (2006.01)

(52) U.S. Cl. .................... 704/9; 704/1; 704/2
(58) Field of Classification Search .............. None
See application file for complete search history.

(56) References Cited

U.S. PATENT DOCUMENTS

| | | | |
|---|---|---|---|
| 5,677,991 A | 10/1997 | Hsu et al. ............. 704/255 |
| 5,687,364 A | 11/1997 | Saund et al. ............ 704/5 |
| 5,687,383 A | 11/1997 | Nakayama et al. ....... 704/2 |
| 5,768,603 A | 6/1998 | Brown et al. ............. 704/9 |
| 5,893,134 A | 4/1999 | O'Donoghue et al. ... 715/536 |
| 6,076,059 A | 6/2000 | Glickman et al. ....... 704/260 |
| 6,122,613 A | 9/2000 | Baker .................. 704/235 |
| 6,173,259 B1 | 1/2001 | Bijl et al. ............. 704/235 |
| 6,182,026 B1 | 1/2001 | Tillmann et al. .......... 704/2 |
| 6,195,631 B1 | 2/2001 | Alshawi et al. .......... 704/4 |
| 6,304,841 B1 | 10/2001 | Berger et al. ............ 704/2 |
| 6,470,307 B1 | 10/2002 | Turney ................... 704/9 |
| 2001/0051868 A1 | 12/2001 | Witschel ................. 704/9 |
| 2002/0069047 A1 | 6/2002 | Ma et al. ................ 704/2 |
| 2002/0095290 A1* | 7/2002 | Kahn et al. ............ 704/260 |
| 2002/0111793 A1 | 8/2002 | Luo et al. ............. 704/10 |
| 2002/0152081 A1 | 10/2002 | Kitamura et al. ....... 704/277 |
| 2006/0116867 A1* | 6/2006 | Moore .................... 704/2 |

OTHER PUBLICATIONS

Kupiec, Julian, "An Algorithm for Finding Noun Phrase Correspondences in Bilingual Corpora," Proceedings of the 31st Conference on Association of Computational Linguistics, Jun. 1993.

(Continued)

*Primary Examiner*—David Hudspeth
*Assistant Examiner*—Matthew J Sked
(74) *Attorney, Agent, or Firm*—Theodore M. Magee; Westman, Champlin & Kelly, P.A.

(57) ABSTRACT

A method of training a natural language processing unit applies a candidate learning set to at least one component of the natural language unit. The natural language unit is then used to generate a meaning set from a first corpus. A second meaning set is generated from a second corpus using a second natural language unit and the two meaning sets are compared to each other to form a score for the candidate learning set. This score is used to determine whether to modify the natural language unit based on the candidate learning set.

7 Claims, 3 Drawing Sheets

OTHER PUBLICATIONS

Brill, Eric, "Transformation-Based Error-Driven Learning and Natural Language Processing: A Case Study in Part-of-Speech Tagging," Computational Linguistics, vol. 21, issue 4, Dec. 1995.

Brown, P., J. Lai, et al., "Aligning Sentence in Parallel Corpora.", Proceedings of the 29th Annual Meeting of the Assoc. for Computational Linguistics, (1991).

Charniak, E., "A Maximum-Entropy-Inspired Parser", Proceedings of the North American Conf. of the Assoc. for Computational Linguistics (2000).

Collins, M., "A New Statistical Parser Based on Bigram Lexical Dependencies", Proceedings of the 34th Annual Meeting of the Assoc. for Computational Linguistics (1996).

Marcus, M., B. Santorini, et al., "Building a Large Annotated Corpus of English: the Penn Treebank," Computational Linguistics (1993).

Satta, G. and E. Brill, "Efficient Transformation-Based Parsing", Proceedings of the Conf. of the Assoc. for Computational Linguistics (1996).

* cited by examiner

METHOD AND APPARATUS FOR UNSUPERVISED TRAINING OF NATURAL LANGUAGE PROCESSING UNITS

REFERENCE TO RELATED APPLICATIONS

The present application is a divisional of and claims priority from U.S. patent application Ser. No. 09/849,833, filed on May 4, 2001 now U.S. Pat. No. 7,016,829 and entitled "Method and Apparatus for Unsupervised Training of Natural Language Processing Units".

BACKGROUND OF THE INVENTION

Natural language understanding involves converting a string of characters into a meaning set representing the meaning of the string of characters. Such processing can involve a number of natural language components including a segmentation component that assigns characters to individual words, a part of speech tagger that identifies the part of speech of each word, a syntactic parser that assigns a structure to a sentence or group of sentences so that the syntactic relationship between the words can be understood and a semantic interpreter that analyzes the syntactic parse to produce a semantic structure.

Each component in a natural language system must be trained before it can be used. In the past, such training has largely been done by hand. For example, the rules used by syntactic parsers to parse sentences were derived by hand. However, training by hand is a laborious process of trial and error. Because of this, more recent systems have attempted to develop natural language components automatically, using supervised machine learning techniques for training.

For example, in supervised training of a parser, a corpus of input sentences is created that is annotated to indicate the syntactic structure of each sentence. Such annotated sentences are referred to as tree banks in the art. During training, proposed changes to the parsing rules, known as candidate learning sets, are tested by repeatedly parsing the tree bank using a different candidate learning set for each parse. The candidate learning set that provides the best parse based on the annotations in the tree bank is then used to change the parser rules.

One problem with using supervised training is that it is expensive and time-consuming. For example, tree banks are so expensive and time-consuming to create that there are very few in existence in the world.

Thus, a less expensive and less time-consuming method is needed for training natural language processing components.

SUMMARY OF THE INVENTION

A method of training a natural language processing unit applies a candidate learning set to at least one component of the natural language unit. The natural language unit is then used to generate a meaning set from a first corpus. A second meaning set is generated from a second corpus using a second natural language unit and the two meaning sets are compared to each other to form a score for the candidate learning set. This score is used to determine whether to modify the natural language unit based on the candidate learning set.

DETAILED DESCRIPTION OF ILLUSTRATIVE EMBODIMENTS

Figure 1:
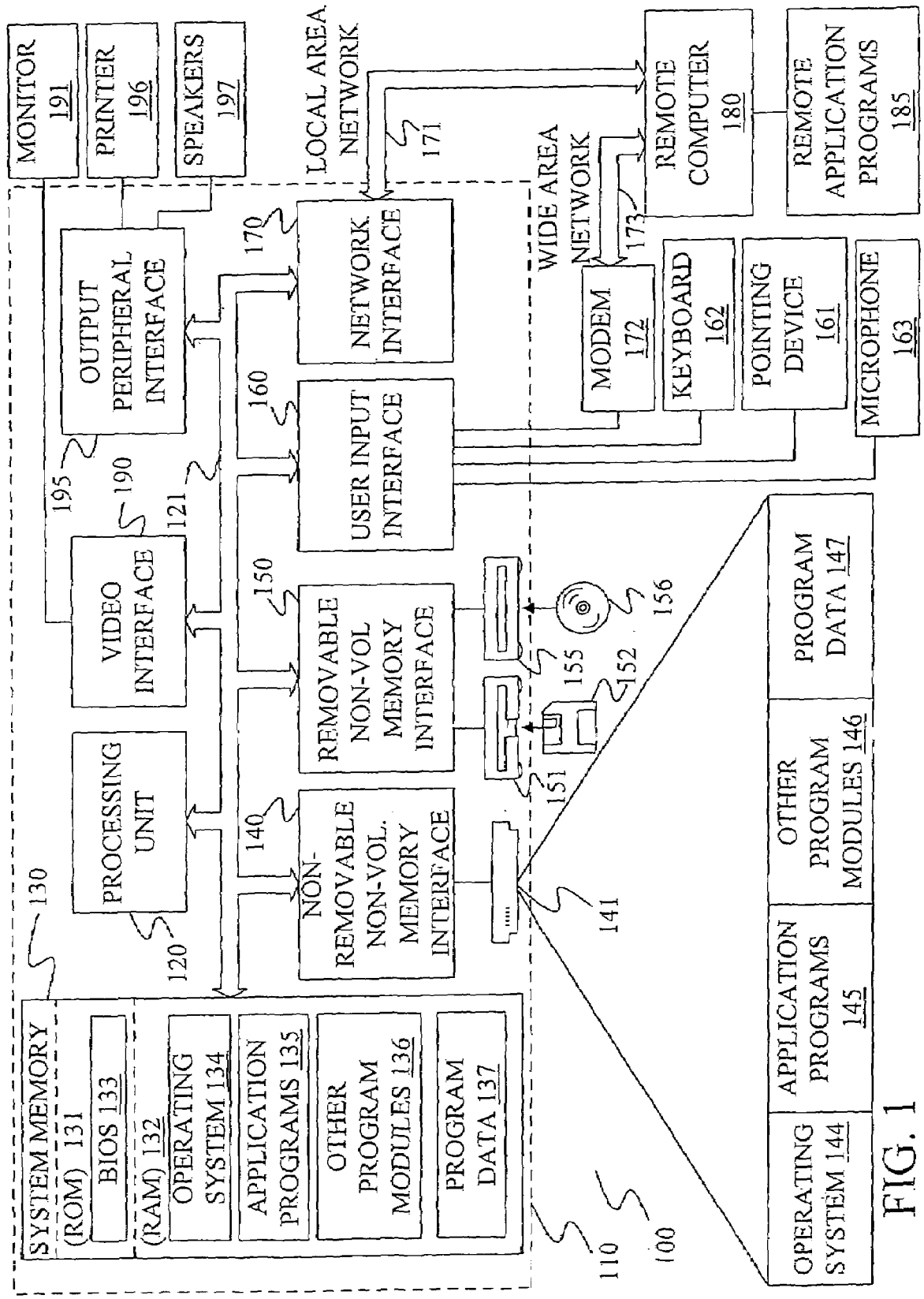
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a method and apparatus for performing unsupervised training of one or more natural language processing components, such as syntactic parsers and/or semantic interpreters. The invention performs this training by utilizing at least two natural language processing systems, typically consisting of a syntactic parser and semantic interpreter, possibly with other components. These systems are used to form separate meaning sets from parallel corpora, which represent the same set of sentences written in different languages. Thus, one natural language processing system generates a meaning set from the corpus written in a first language, such as English, while a second natural language processing system generates a meaning set from the corpus written in a second language, such as French. The two meaning sets are compared and the configuration of one or more of the components of the natural language processing systems is adjusted so that the meaning sets converge toward each other. The configurations for the components that provide the best convergence for the meaning sets are then selected and the training ends.

The method and apparatus of the present invention are described below with reference to the flow diagram of FIG. 2 and the block diagram of FIG. 3.

Figure 3:
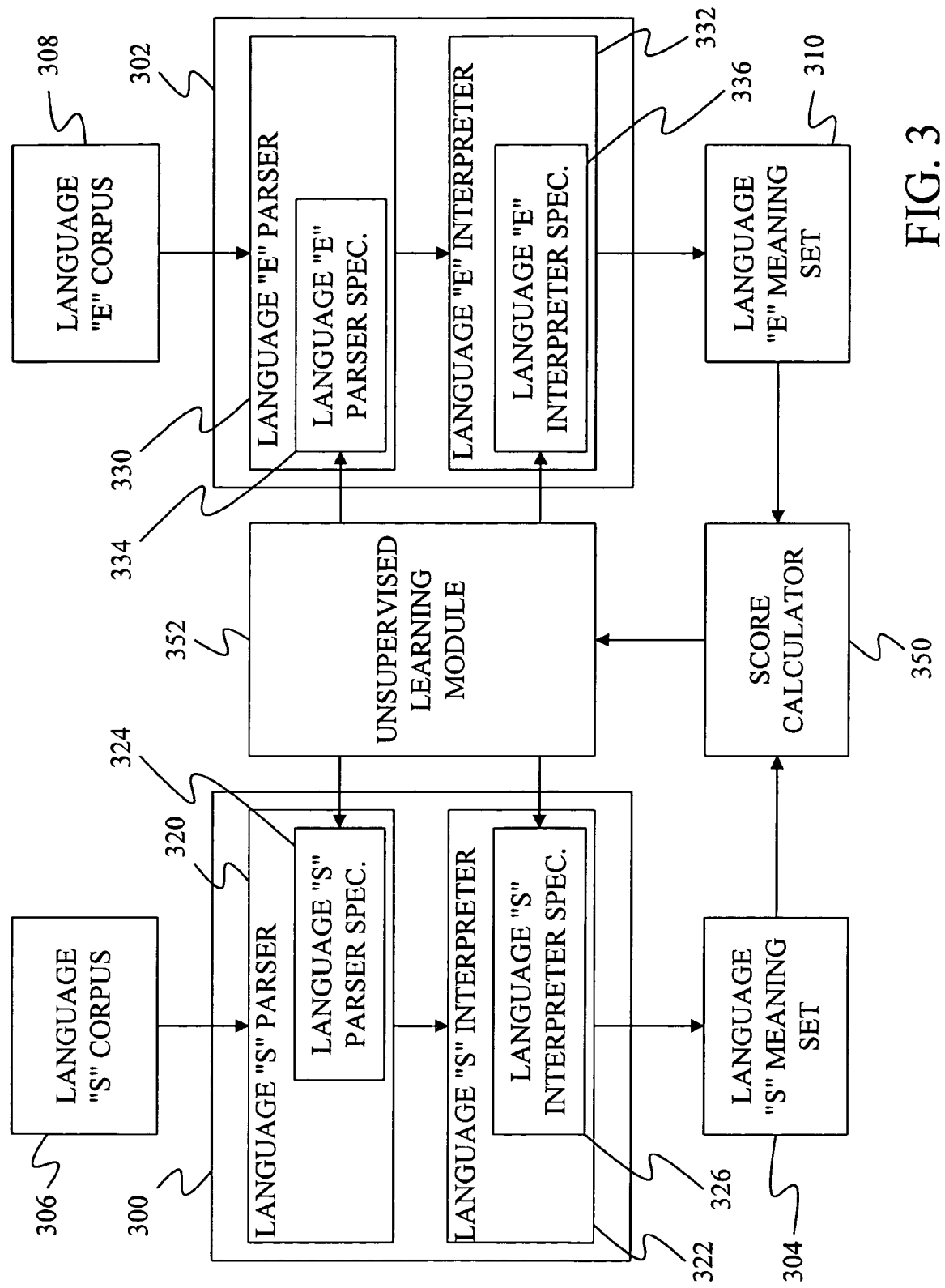
FIG. 3 is a block diagram of a training system under one embodiment of the present invention.

In the block diagram of FIG. 3, two sets of natural language processing units 300 and 302 are provided. Each natural language processing unit derives a meaning set from a corpus written in a separate language. Thus, natural language processing unit 300 derives a meaning set 304 from a corpus 306 written in a language "S", while natural language processing unit 302 derives a meaning set 308 from a corpus 310 written in a language "E". Note that language "S" and language "E" can be any known written language.

Language S corpus 306 and language E corpus 308 contain sentences expressing identical meaning written in different languages under most embodiments. Thus, together they form a single bilingual corpus. The sentences in each corpus are aligned such that a sentence or groups of sentences that convey a meaning in one corpus are aligned with the sentences or groups of sentences that convey the same meaning in the other corpus. For instance, if the meaning in the first sentence in corpus 306 is the same as the meaning in the first sentence in corpus 308, the first sentence in corpus 306 is aligned with the first sentence in corpus 308. Note that if the meaning found in one sentence of a corpus is expressed in two sentences in the other corpus, the single sentence of the first corpus would be aligned with the two sentences of the second corpus.

Natural language processing unit 300 includes a syntactic parser 320 and a semantic interpreter 322 for language "S". The operation of syntactic parser 320 and semantic interpreter 322 are controlled by a parser specification 324 and an interpreter specification set 326, respectively, where each specification defines the input/output mappings of the component. For example, the interpreter specification defines the meaning sets that will be produced at the output of the interpreter for various input semantic structures.

Similarly, natural language processing unit 302 includes a language "E" syntactic parser 330 and a semantic interpreter 332 that are controlled by a parser specification 334 and an interpreter specification 336, respectively.

Note that natural language processing units 300 and 302 can also include other natural language components such as a part of speech tagger or a segmentation component. Although these additional components are not shown in FIG. 3 for simplicity, those skilled in the art will recognize that the present invention can be applied to any of the trainable natural language components that are present in a natural language understanding unit.

Under the method of the present invention, one or more of the specifications 324, 326, 334 and/or 336 are adjusted through unsupervised training. In the description below, an unsupervised training method involving generating and testing candidate learning sets is described. However, those skilled in the art will recognize that the present invention may be incorporated in other unsupervised training techniques such as greedy hill climbing and variants of the expectation-maximization algorithm.

Figure 2:
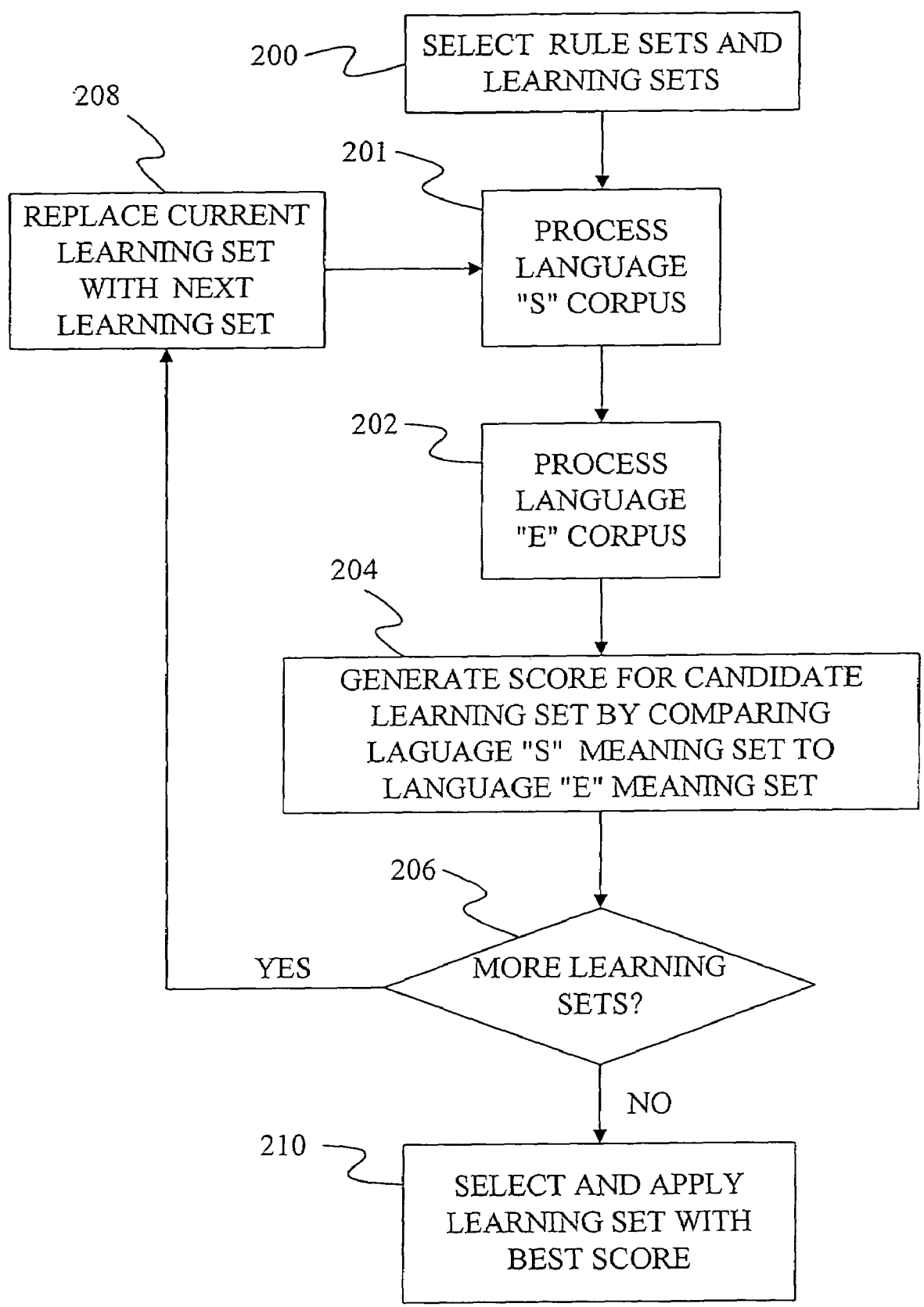
FIG. 2 is a flow diagram of a method of training a natural language unit under one embodiment of the present invention.

The generating and testing embodiment of the present invention is shown in FIG. 2 and begins at step 200 where an unsupervised learning module 352 in FIG. 3 selects an initial specification for each of the parsers and interpreters. In addition, learning module 352 selects one or more learning sets, which are candidate changes that are to be tested using the process of FIG. 2. Specifically, each learning set will be individually applied to the various natural language component specifications. By applying each learning set, the training method of the present invention is able to determine which candidate change provides the best improvement in the natural language units.

Using the selected specifications, the process of FIG. 2 continues at step 201 where natural language processing unit 300 performs natural language processing on language "S" corpus 306 to produce a baseline meaning set 304. At step 202, natural language processing unit 302 performs natural language processing on language "E" corpus 308 to produce a baseline meaning set 310.

Once each natural language processing unit has formed its meaning sets, the meaning sets are compared to one another at step 204 by a score calculator 350 to generate a combined score for the two meaning sets. Under one embodiment, this score is generated using the following distance calculation:

$$MR \text{ Distance} = \frac{\sum_{i=1}^{N} Sim(M_i^E, M_i^S)}{N} \quad \text{EQ. 1}$$

where $Sim(M_i^E, M_i^S)$ is a similarity function that provides some measure of the similarity between a meaning $M_i^E$ for a sentence "i" in language corpus E and a meaning $M_i^S$ for corresponding sentence or sentences i in language corpus S. In Equation 1, the sum is performed over all N sentences in each corpus, with the division providing an average similarity or distance score.

After the score for the current component specifications have been determined, unsupervised learning module 352 determines whether there is a learning set that should be tested at step 206. If there is a learning set that needs to be tested, the process continues at step 208 where learning module 252 changes one or more of the component specifications to implement the learning set to be tested. The process then repeats steps 201, 202 and 204 by processing the bilingual language corpus using the current learning set and comparing the resulting meaning sets to produce a score for the current learning set.

Steps 201, 202, 204, 206 and 208 are repeated until a score has been generated for each candidate learning set. When there are no more learning sets to be tested at step 206, the process continues at step 210 where the learning set that provides the highest score is selected. The appropriate component specifications are then changed to implement the selected learning set.

The process of FIG. 2 can be repeated for multiple learning sets, thereby progressively improving the component specifications of the natural language units.

Note that although two natural language units were used in FIGS. 2 and 3, in other embodiments, larger numbers of natural language units are used. In such embodiments, the learning sets can be limited to a single natural language unit or may be distributed across several natural language units.

In embodiments that limit the learning sets to a single natural language unit, a separate distance measure is determined between the changing natural language unit and all of the other natural language units. Under one embodiment, these separate distance scores are averaged to form a single distance score for the current learning set. In other embodiments, the maximum or minimum distance score is selected as the distance score for the learning set.

Because the present invention adjusts each natural language component specification based on the meaning set provided by the natural language unit, each component is improved so that it provides a better meaning set instead of just a better output from the component itself. Since producing a good meaning set is goal of a natural language understanding unit, it is thought that improving each component based on the output meaning set produces more useful components for natural language processing units.

Note that once a natural language component has been trained under the present invention, it may be used outside of natural language understanding. Thus, a syntactic parser trained under the present invention may be used in a grammar checker that does not include a semantic interpreter.

Although the invention above was described in terms of generating a meaning set, in other embodiments, the natural language unit generates a set of actions based on the language corpus instead of a meaning set. For example, in an embodiment where the natural language unit is used to control a robot, the output of the natural language unit is a set of actions performed by the robot. In such embodiments, the set of actions produced by natural language units 300 and 302 are compared to each other to generate a score instead of using a meaning set. This score is then used to modify one or more of the natural language units so that the actions produced by the two units are more similar.

Although the present invention has been described with reference to particular embodiments, workers skilled in the art will recognize that changes may be made in form and detail without departing from the spirit and scope of the invention.

What is claimed is:

1. A method of training a natural language unit comprising:
   generating a first meaning set from a first text corpus using a first natural language unit;
   generating a second meaning set from a second text corpus using a second natural language unit;
   comparing the first meaning set to the second meaning set to generate a score; and
   using the score to determine how to modify the first natural language unit.

2. The method of claim 1 wherein the first text corpus comprises a corpus written in a first language and the second text corpus comprise the corpus written in a second language.

3. The method of claim 2 wherein the second corpus is aligned with the first text corpus.

4. A computer-readable medium having computer-executable instructions for performing steps for training natural language units, the steps comprising:
   converting a corpus of text sentences into at least two meaning sets by applying the corpus to at least two different natural language units; and
   comparing the meaning sets to evaluate the performance of one or more of the at least two natural language units.

5. The computer-readable medium of claim 4 wherein converting a corpus of text sentences comprises converting a corpus comprising text sentences from at least two different languages.

6. A method of training a natural language unit comprising:
   generating a first action set comprising a set of actions to be performed, from a first corpus using a first natural language unit;
   generating a second action set comprising a set of actions to be performed, from a second corpus using a second natural language unit;
   comparing the first action set to the second action set to generate a score; and
   using the score to determine how to modify the first natural language unit.

7. The method of claim 6 wherein the first corpus comprises a corpus written in a first language and the second corpus comprise the corpus written in a second language.

* * * * *